Nov. 26, 1935.  B. H. DE MOTT  2,022,409
TWINE DISPENSER
Filed June 12, 1934
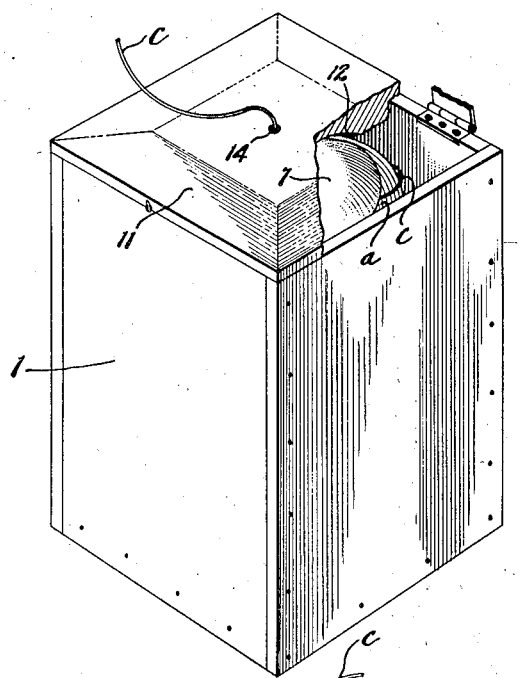
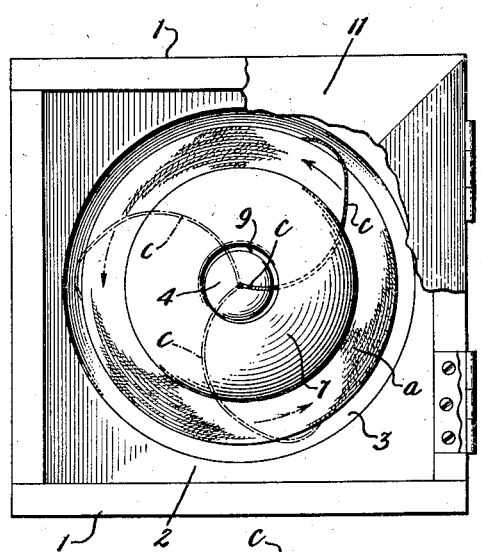
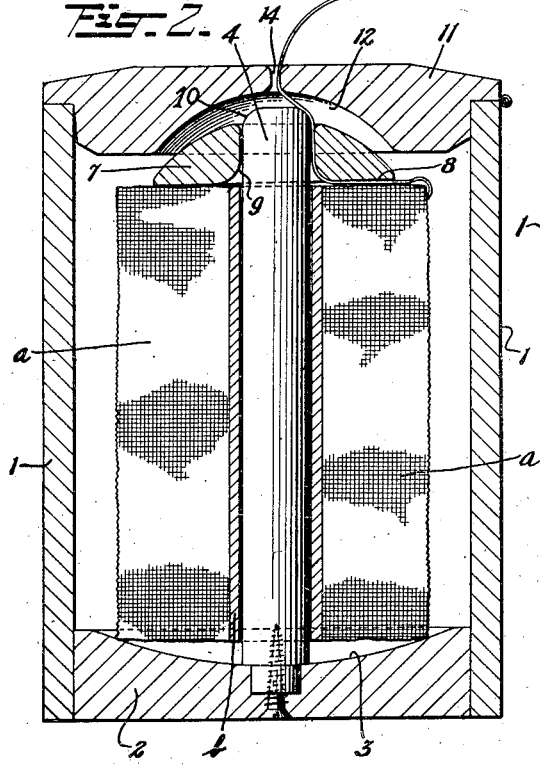
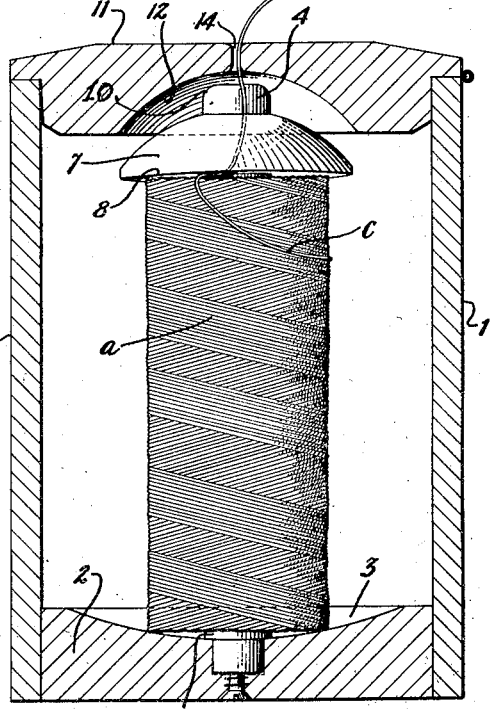
INVENTOR
B. H. De Mott
BY
Morgan, Finnegan & Durham
ATTORNEYS Patented Nov. 26, 1935

2,022,409

UNITED STATES PATENT OFFICE 2,022,409

TWINE DISPENSER

Benyew H. De Mott, Millington, N. J.

Application June 12, 1934, Serial No. 730,186

12 Claims. (Cl. 242—140)

The invention relates to novel and useful improvements in twine dispensing means or mechanism, and in certain of its features the invention relates especially to devices for convenient and efficient protection and dispensing of twine that has been wrapped helically in cylindrical rolls having flat ends.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serve to explain the principles of the invention.

Of the drawing:—

Fig. 1 is a perspective view of the casing with parts broken away;

Fig. 2 is a vertical central section of the device of Fig. 1;

Fig. 3 is a top plan corresponding to Fig. 1 with most of the cover broken away; and Fig. 4 corresponds to Fig. 2, but shows the twine roll about one-half depleted.

Objects of the invention are to provide a device as described having preferably a protecting casing; to provide dispensing means whereon the twine roll is readily and certainly insertable automatically into operative dispensing position; to provide means acting to hold the twine roll against spinning or loose movement tending to unwind, bunch or tangle the twine, such means preferably coming into operation automatically by merely inserting the twine roll, and also acting irrespective of changes in the size of the twine roll, as it is gradually drawn off and a new roll inserted. A further object of the invention is to provide means whereby the paying out twine moves circularly about the roll with little or no slack as it unwinds from the periphery thereof, and at the same time guarding positively against breakage and the formation of slack from violent jerks or pulls on the twine or otherwise, thereby safeguarding against snarls, loops, backlash and the like; to provide for effecting these objects by simple means which exert slipping friction on the paying out twine for the purpose of guiding it circularly about the twine roll, and preferably guiding it over the flat end of the roll, and also preferably substantially axially away therefrom regardless of the direction of pull. Further advantages of the invention will be set forth in connection with the following detailed description of the present preferred embodiment, and it will be understood that the foregoing general description, and the following detailed description as well, are illustrative and exemplary of the invention and are not restrictive thereof.

Referring now in detail to the embodiment of the invention illustrated by way of example in the accompanying drawing, a casing 1 is shown which is preferably employed for protecting the twine roll against damage or disturbance, the casing being adapted to be set upon a shelf or upon the floor. The embodied form of means for holding the twine roll against accidental or undesired movement or rotation is brought into operative relation by merely placing the twine roll *a* in place in the dispensing device, and in said embodiment said means act upon the circular edge of the bottom end of the twine roll. In this embodiment the bottom 2 of the casing is concave as shown at 3, and fixed concentrically with the concavity, and extending upwardly from the bottom 3, is a spindle 4 upon which the twine roll *a*, wound on its cop or spool *b*, is axially mounted. Thus as a fresh twine roll *a* is slipped onto spindle 4, the flat circular peripheral bottom face or end of the twine roll engages about its peripheral edge with the surface of the concavity 3, and thus frictionally holds the roll *a* against rotation, and this relation remains irrespectively of changes in the diameter of the twine roll as the twine is gradually drawn off. The twine is also prevented from passing beneath the roll.

In the embodied form of means for guiding the paying out twine circularly about the periphery of the roll, and at the same time restraining it against undesired movement, devices are provided for exerting slipping friction upon the twine against the top flat end of the roll, and thereby guiding it about the periphery of the twine roll, and also substantially radially inwardly and then approximately axially away from the roll. As embodied, a weight member 7, has a flat lower face 8 adapted to rest upon the flat top end or face of the twine roll with the twine *c* frictionally and slippingly held therebetween. The member 7 has a central opening 9 into or through which the upper end 10, preferably rounded or tapered, of the spindle 4 projects. The casing 1 is provided with a hinged lid 11, and the inner surface of the lid is hollowed, as shown at 12, to receive and loosely position the member 7. The lid 11 is provided with a central guide aperture 14, preferably on the axis of the spindle 4. As the twine c is drawn off, through guide opening 14, it will rotate about the rounded top 10 of the spindle 4, and while being pressed frictionally against the top face of the roll will slip angularly along the face of the roll beneath the weight 7, and at the same time move radially inwardly over the flat top face of the roll a. Thus the twine will unwind in a circular path from its circular or helicoidal winding about the roll, and thus avoid slack, knottings, tangles, backlash or other disturbances, and will not be disarranged by sudden or forceful jerks in drawing off the twine. The twine c as it is drawn off from the roll a is frictionally pressed against smooth and rounded surfaces or edges 9, 10, and 14, which coact frictionally with the other elements to give the necessary control and direction to the paying out twine, thus insuring smooth and easy running of the twine and avoiding snarls, breaks or fraying.

It will be understood that various changes may be made in constructional features of the illustrated embodiment, within the scope of the appended claims, without departing from the principles of the invention or sacrificing its chief advantages.

What I claim is:

1. A dispenser for a flat ended roll of twine including in combination a support for the twine roll exerting a holding friction on the bottom peripheral edge of the roll, irrespective of change in diameter of the roll, and means frictionally engaging the paying off twine from the top periphery of the roll inwardly toward the axis for guiding the paying out twine circularly and longitudinally of and about the exterior of the roll as it is drawn off therefrom.

2. A dispenser for a flat ended roll of twine including in combination a concave support for the twine roll exerting a holding friction on the bottom peripheral edge of the roll, irrespective of change in diameter of the roll, a spindle projecting from the center of the concavity, and means frictionally engaging the paying off twine from the top periphery of the roll inwardly toward the axis for guiding the paying out twine circularly about the exterior of the roll as it is drawn off therefrom.

3. A dispenser for a flat ended roll of twine including in combination a support for a twine roll, and means for guiding the paying out twine circularly about and along the exterior of the roll and under loose frictional engagement over the flat end toward the axis of the roll and then substantially away from the axis of the roll.

4. A dispenser for a flat ended roll of twine including in combination a support for a twine roll, and means for slippingly and frictionally holding the paying out twine against the flat end of the roll thereby to guide it circularly about and longitudinally along the roll as it pays out from the roll.

5. A dispenser for a flat ended roll of twine including in combination a support for a twine roll, and means for slippingly and frictionally holding the paying out twine against the flat end of the roll and thence out substantially axially thereby to guide it circularly about the roll as it pays out from the roll.

6. A dispenser for a flat ended roll of twine including in combination a support for a twine roll, and means for slippingly and frictionally holding the paying out twine against the flat end of the roll and thence outwardly rotationally about the axis thereby to guide it circularly about the roll as it pays out from the roll.

7. A dispenser for a flat ended roll of twine including in combination a spindle on which the twine roll is mounted, a concave support for the twine roll exerting a holding friction on the bottom peripheral edge of the roll, irrespective of change in the diameter of the roll, and means for frictionally guiding the paying out twine circularly about the exterior of the roll and substantially angularly and radially over the end of the roll as it is drawn off therefrom.

8. A dispenser for a flat ended roll of twine including in combination a vertical spindle on which the twine roll is mounted, a weight encircling the spindle and resting upon the top flat end of the twine roll, the paying out twine passing between, and being frictionally pressed by the weight and the flat end of the roll and the spindle to exert friction on the twine and guide it circularly about the roll and in an inward radial direction as it pays out.

9. A dispenser for a flat ended roll of twine including in combination a vertical spindle, a concave bottom support exerting holding friction on the flat peripheral edge of the roll irrespective of change in the size of the roll, a weight resting on the top flat face of the twine, roll and encircling the spindle, the paying out twine passing from the exterior of the roll inwardly beneath the weight and between it and the flat top of the twine roll and between the weight and spindle the spindle to exert friction on the twine and guide it circularly about the roll as it pays out.

10. A dispenser for a flat ended roll of twine including in combination a casing for enclosing a twine roll, the casing bottom being concaved to exert friction on the flat peripheral edge of a twine roll resting thereon, a spindle projecting upwardly on which the twine roll is axially mounted, a weight resting upon the flat top of the twine roll and encircling the spindle, the paying out twine passing from the exterior of the roll inwardly beneath the weight and between it and the flat top of the twine roll and between the weight and the spindle, frictional slipping pressure being thereby exerted on the twine to guide it circularly about the roll as it pays out, and a guide for the twine near the end of the spindle.

11. A dispenser for a flat ended roll of twine including a support for a twine roll, means for holding the roll against rotation, and means for paying off the twine from the exterior of the roll and directing it inwardly over the end and at the same time angularly about the roll and for exerting slipping friction upon said inwardly and angularly directed portion of the twine between the periphery and the center of the roll.

12. A dispenser for a flat ended roll of twine including a support for a flat ended roll of twine, means for restraining the roll from movement, and means for paying off the twine from the outside of the twine roll and directing it both inwardly over the ends of the roll and angularly about the end of the roll, an annular centrally perforate weight resting on the flat end of the roll of twine, the twine passing under friction between the end of the roll and the weight and out through the central aperture of the weight.

BENYEW H. DE MOTT.